(12) United States Patent
Tanaka

(10) Patent No.: US 6,260,598 B1
(45) Date of Patent: Jul. 17, 2001

(54) PNEUMATIC TIRE WITH LOOPED TREAD-SIDEWALL REINFORCEMENT

(75) Inventor: Takashi Tanaka, Akashi (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/112,314

(22) Filed: Jul. 9, 1998

(30) Foreign Application Priority Data

Jul. 11, 1997 (JP) .................................................... 9-186917
Jul. 11, 1997 (JP) .................................................... 9-186918
Jul. 11, 1997 (JP) .................................................... 9-486916

(51) Int. Cl.$^7$ .................................. B60C 9/00; B60C 9/02
(52) U.S. Cl. ......................... 152/555; 152/548; 152/558; 156/117
(58) Field of Search ..................................... 152/548, 550, 152/552, 554, 555, 558, 562, 533; 156/117, 133

(56) References Cited

U.S. PATENT DOCUMENTS

| | | | |
|---|---|---|---|
| 1,930,764 | * 10/1933 | Mallory | ................................. 152/548 |
| 2,906,314 | 9/1959 | Trevaskis et al. . | |
| 4,231,408 | * 11/1980 | Replin | ............................. 152/548 X |
| 4,248,287 | 2/1981 | Christman . | |
| 4,917,744 | 4/1990 | Knipp et al. . | |

FOREIGN PATENT DOCUMENTS

| | | |
|---|---|---|
| 208941C | 4/1909 | (DE) . |
| 228647C | 11/1910 | (DE) . |
| 0129183A2 | 12/1984 | (EP) . |
| 1141940A | 11/1957 | (FR) . |
| 498507A | 2/1939 | (GB) . |
| 786164A | 11/1957 | (GB) . |

* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire comprises a tread-sidewall reinforcement extending between the tire sidewall portions through the tread portion which has a symmetrical cord arrangement to prevent ply steer. The tread-sidewall reinforcement is made of a series of loops of at least one reinforcing cord which loops spread over the circumference of the tire. The tread-sidewall reinforcement can be formed as a carcass or a reinforcing layer disposed outside a carcass. When viewed in the radial direction, the inclination angle of the reinforcing cord with respect to the tire circumferential direction is substantially 90 degrees at the tire equator and decreases to substantially 0 degree gradually from the tire equator towards the bead portions. When viewed in the axial direction, the inclination angle of the reinforcing cord with respect to the radial direction is in the range of from 60 to 90 degrees.

14 Claims, 19 Drawing Sheets

PNEUMATIC TIRE WITH LOOPED TREAD-SIDEWALL REINFORCEMENT

FIELD OF THE INVENTION

The present invention relates to a pneumatic tire having an improved tire reinforcing structure being capable of preventing ply steer.

DESCRIPTION OF THE RELATED ART

In bias tires or cross ply tires, the carcass cords are inclined relatively large angles, for example 30 to 50 degrees with respect to the circumferential direction of the tire, and the cord arrangement is not symmetrical with respect to the tire equator. In radial tires, on the other hand, a breaker made of cross plies is usually disposed inside the tread. The breaker cords are also inclined relatively large angles. Thus such tires involve problems of ply steer, which is especially remarkable in the tires for motorcycles.

BRIEF SUMMARY OF THE INVENTION

It is therefore, an object of the present invention to provide a pneumatic tire which has a novel reinforcing structure being usable instead of the conventional bias carcass structure or belt structure and having a completely symmetrical cord arrangement to effectively prevent the ply steer.

In accordance with the present invention, a pneumatic tire is provided which comprises: a tread portion, a pair of sidewall portion, a pair of bead portions, and a tread-sidewall reinforcement extending between the sidewall portions trough the tread portion, the tread-sidewall reinforcement made of a series of loops of at least one reinforcing cord spreading over the circumference of the tire.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
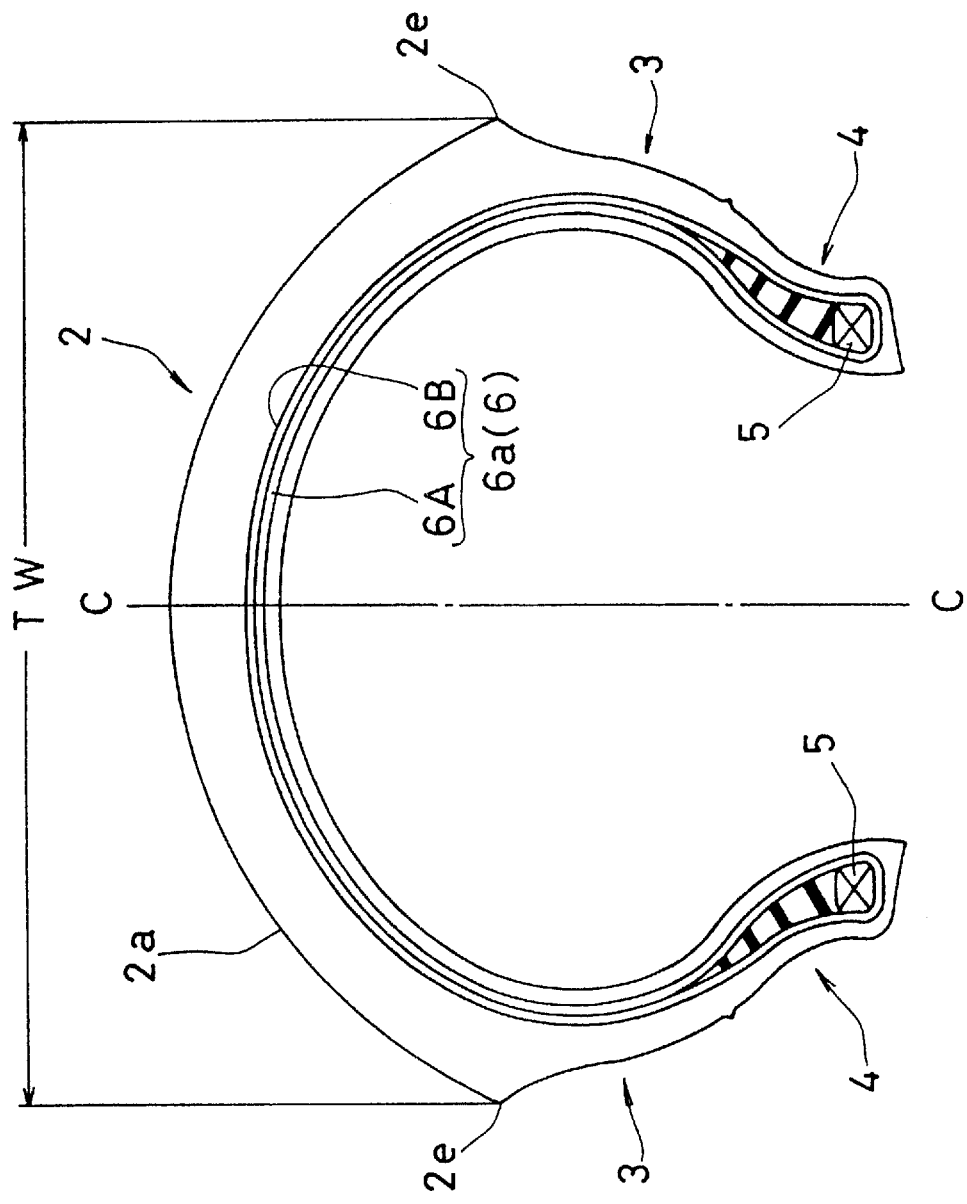
FIG. 1 is a cross sectional view of an embodiment of the present invention.

FIGS. 1–7 shows a first embodiment of the present invention, in which a novel reinforcing structure 6a is employed in the carcass 6.

In this embodiment, the tire is a motorcycle tire comprising a tread portion 2, a pair of axially spaced bead portions 4 with a bead core 5 therein, a pair of sidewall portions 3 extending between the tread edges 2e and the bead portions 4, and the carcass 6 extending between the bead portions 4.

As shown in FIG. 1, the tread portion 2 has a convex tread face 2a which is curved continuously from one of the tread edges 2e to the other so that the maximum tire sectional width TW lies between the tread edges 2e. In the tread portion 2, a tread reinforcing belt layer is not disposed.

Figure 2:
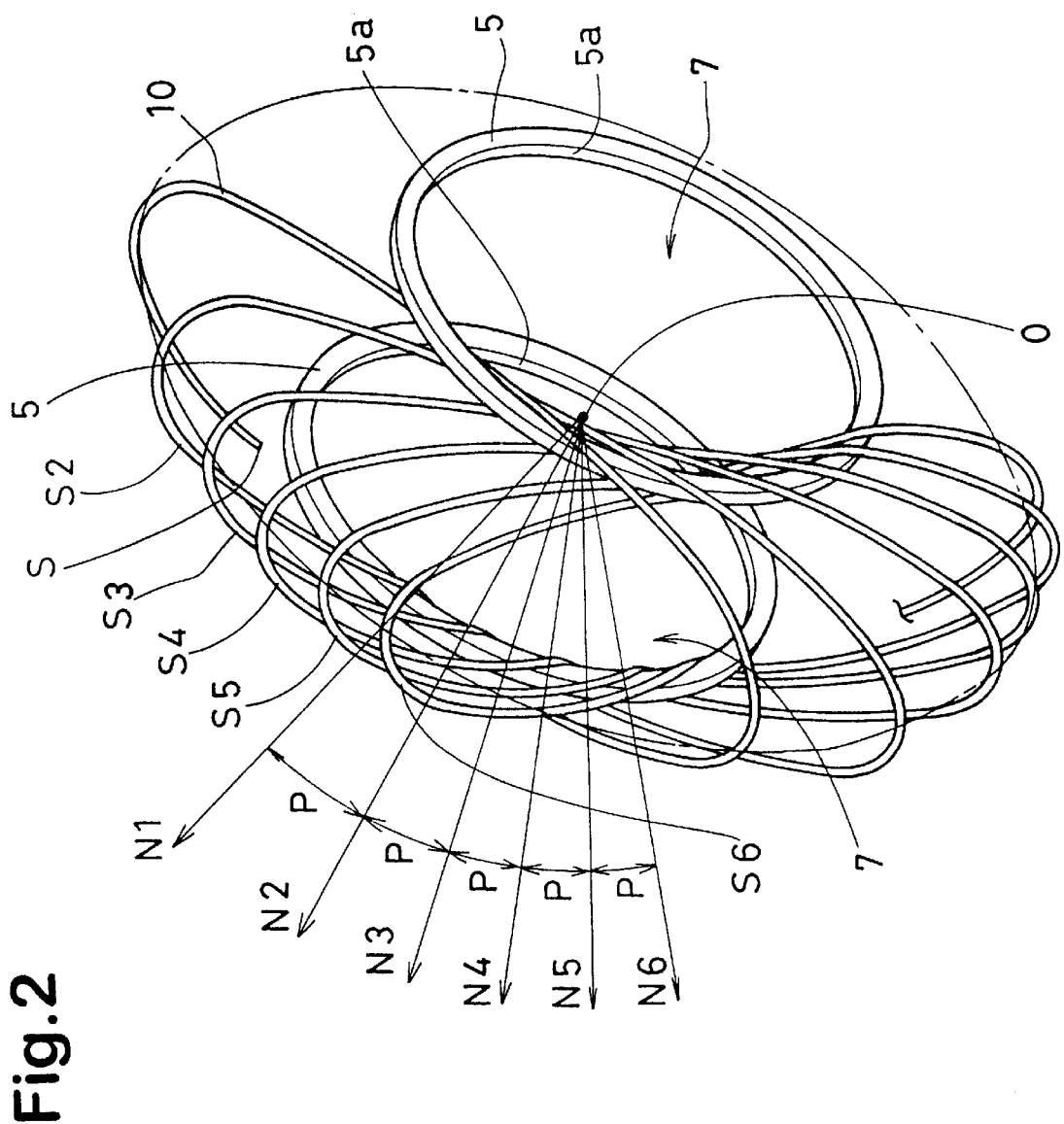
FIG. 2 is a schematic perspective view of the carcass thereof.
Figure 3:
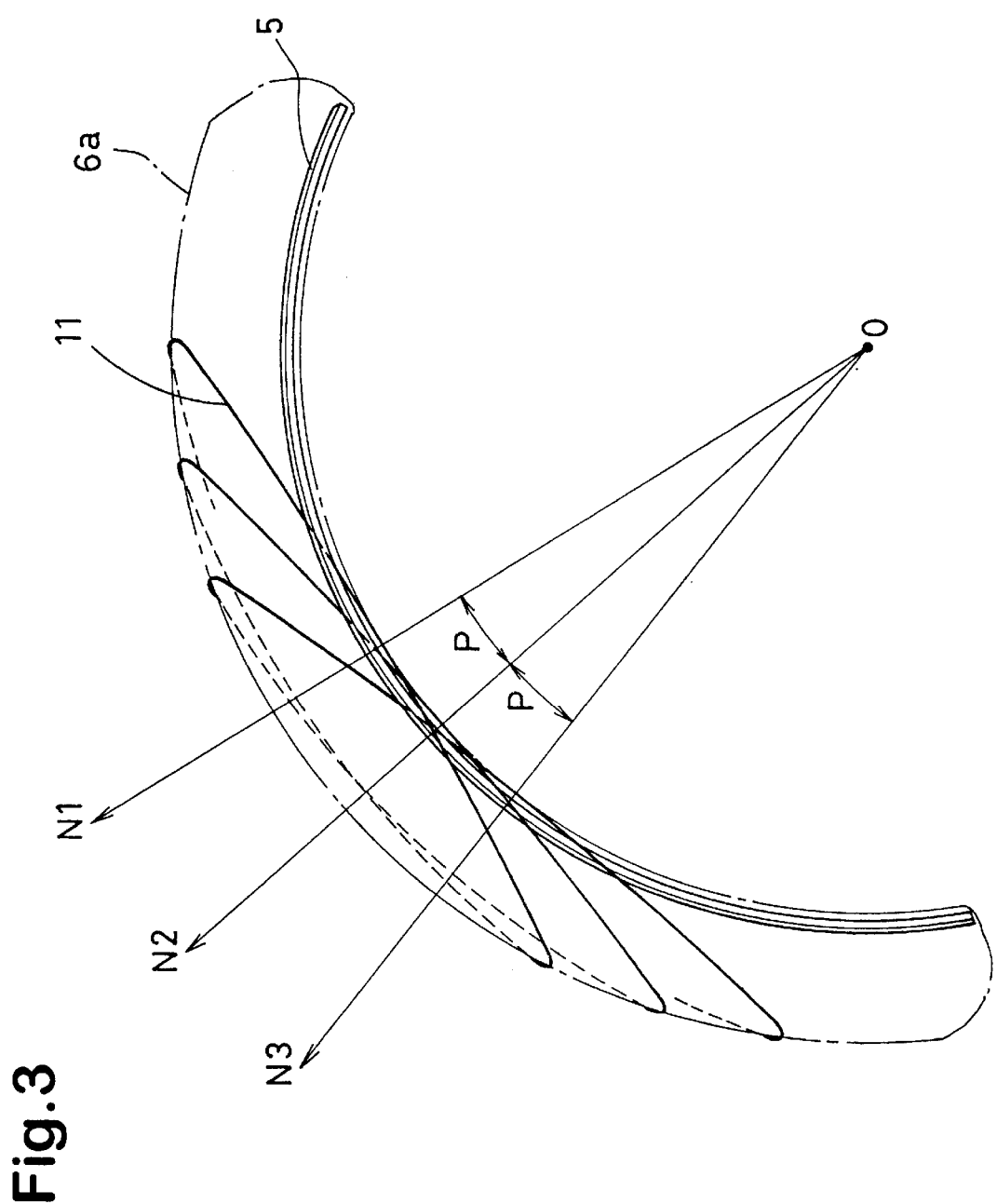
FIG. 3 is a schematic side view of the carcass.

FIGS. 2 and 3 shows the structure of the carcass 6 in this embodiment. In these figures, the circumferential cord spacings are depicted as being very large for convenience sake. In fact the cord spacings are about 1 to 5 mm when measured in the circumferential direction at the tire equator C.

The carcass 6 is composed of a series of loops which spread over the circumference of the tire. The loops are made of at least one continuous reinforcement 10.

Figure 4A:
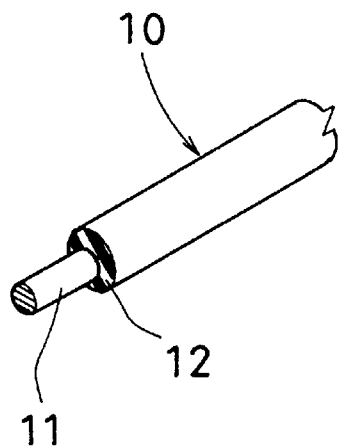
FIG. 4A is a perspective view of a rubber coated reinforcing cord.
Figure 4B:
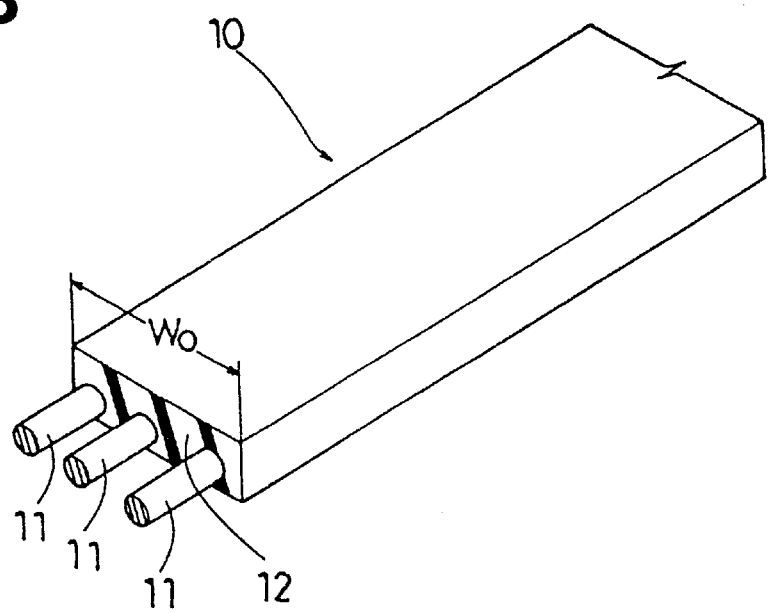
FIG. 4B is a perspective view of a rubber tape in which reinforcing cords are embedded.

The reinforcement 10 is a rubber coated single cord 11 shown in FIG. 4A or a rubber tape shown in FIG. 4B in which parallel cords 11 preferably two to ten cords are embedded along the length thereof. Preferably, the rubber tape 10 has a rectangular cross sectional shape whose width Wo is 5 to 15 mm, whereas the rubber coated single cord 11 has a round cross sectional shape.

For the reinforcing cords 11, a nylon cord is used in this example. However, other organic fiber cords, e.g. rayon, polyester, aramid and the like and steel cords and hybrid cords thereof can be used.

In the carcass 6, the reinforcement 10 extends to draw loops while moving in one circumferential direction at a small pitch angle P around the tire axis O.

If attention is paid to each loop, as shown in FIG. 2, a loop
- starts from a position S for example near the left side bead core ring 5,
- extends to the right side bead core ring 5, describing a half oval,
- passes through the right side bead core ring 5 from the axially inside to the outside,
- extends to the left side be ad core ring 5, describing another half oval,
- passes through the left side bead core ring 5 from the axially outside to the inside, then
- returns to a position which corresponds to the start position S but shifts one pitch angle P in one circumferential direction.

Therefore, as shown in FIG. 1, in a cross section including the tire axis, the carcass 6 has a closed loop structure extending around the bead core 5 in each bead portions. Accordingly, the carcass 6 has a double layered structure throughout. Therefore, separation failure starting from cord ends or ply edge can be completely prevented.

Further, the cord arrangement becomes symmetrical with respect to the tire equator C.

Figure 5:
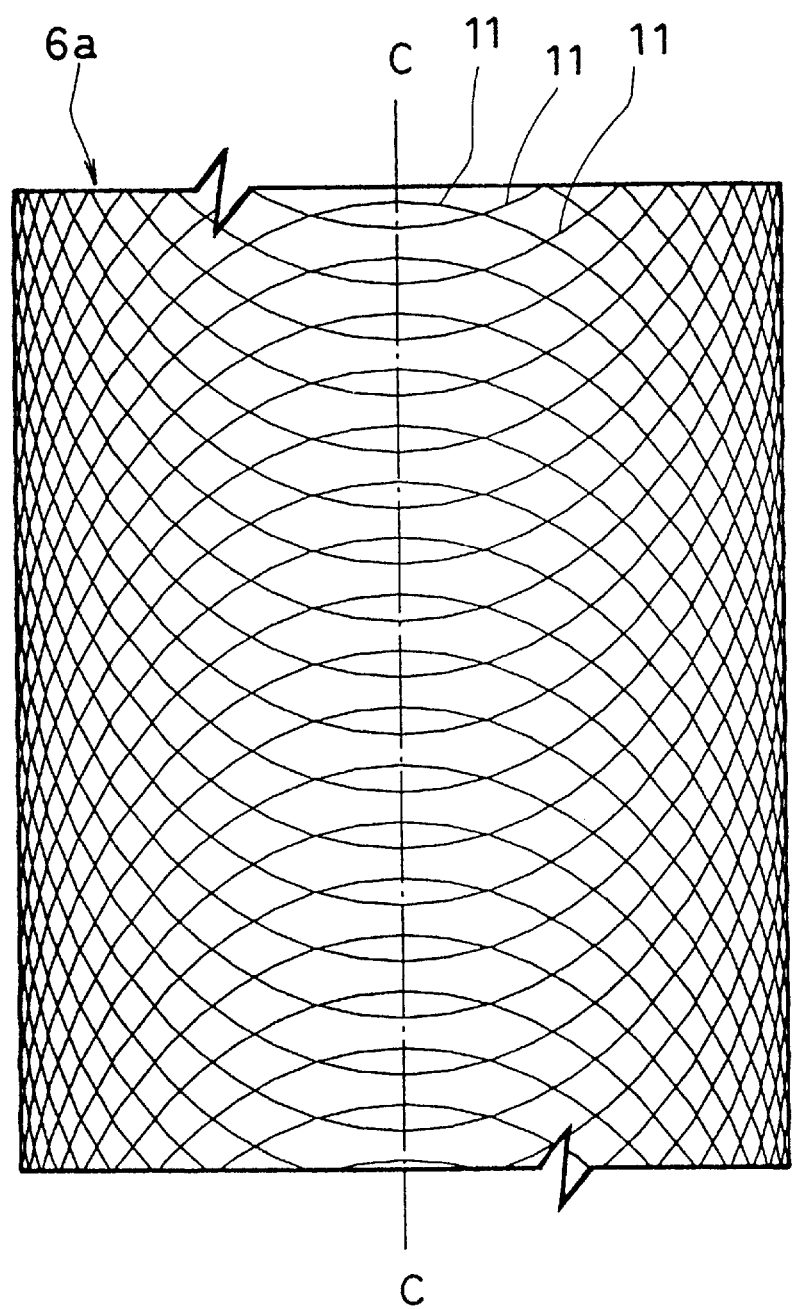
FIG. 5 is a plan view of the carcass.

To put it more concretely, in the tread portion 2, as shown in FIGS. 2 and 5, the cord inclination in the radially outer layer 6B is, for example, a left-side upward inclination on the left side of the tire equator C, but on the right side of the tire equator C, a right-side upward inclination. In the radially inner layer 6A, on the other hand, the cord inclination is reverse to the outer layer 6B. Therefore, the ply steer can be fully prevented.

Figure 6:
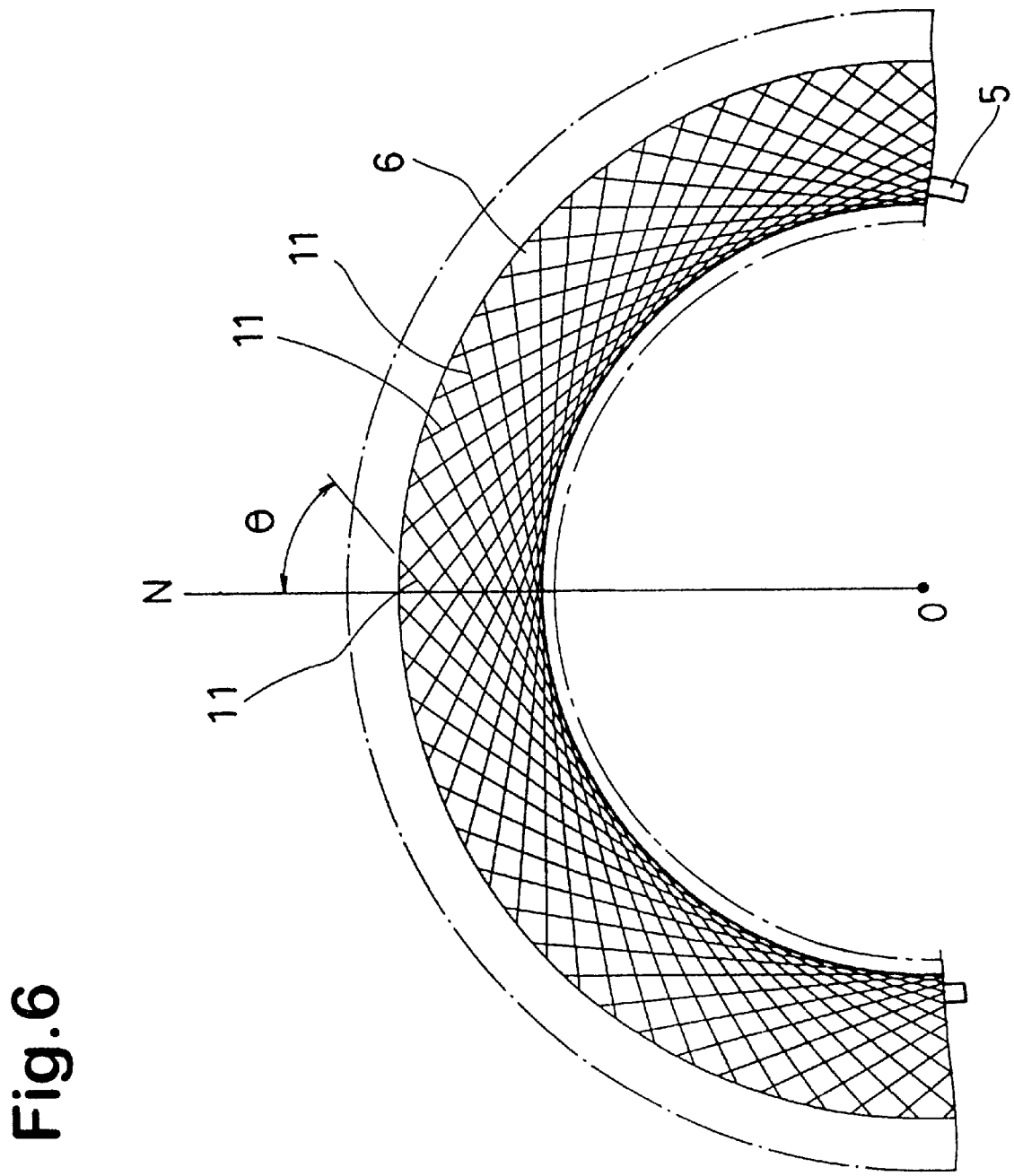
FIG. 6 is a side view of the carcass.

Furthermore, the cord segments in the radially outer layer 6B cross those in the radially inner layer 6A in a symmetrical manner. Also, in the sidewall portions 3, as shown in FIGS. 2 and 6, the cord segments in the inner layer 6A cross those in the outer layer 6B. As a result, the vertical and lateral stiffness of the tire can be improved.

As shown in FIG. 5, all the cord segments in the inner and outer layers 6A and 6B cross the tire equator C at substantially 90 degrees, and the angle with respect to the tire circumferential direction gradually decreases from the tire equator C to the bead cores 5 and becomes substantially zero at the bead cores 5.

As shown in FIG. 6, when the cord 11 is projected on a the tire equatorial plane, the angle θ of the cord 11 with respect to the radial direction N is preferably set in the range of from 60 to 90 degrees. If the angle θ is less than 60 degrees, the circumferentially rigidity of the tire is liable to become insufficient.

The pitch angles P are in the range of from 0.1 to 5 degrees, preferably 0.1 to 2 degrees, more preferably 0.1 to 0.5 degrees, still more preferably 0.1 to 0.3 degrees.

The cord count in the circumferential direction at the tire equator is set in the range of less than 120/5 cm, preferably 20 to 80/5 cm more preferably 30 to 50/5 cm. If more than 120/5 cm, the tread portion 2 and sidewall portion 3 are excessively increased in the rigidity, and the tire production efficiency is not good.

Figure 7:
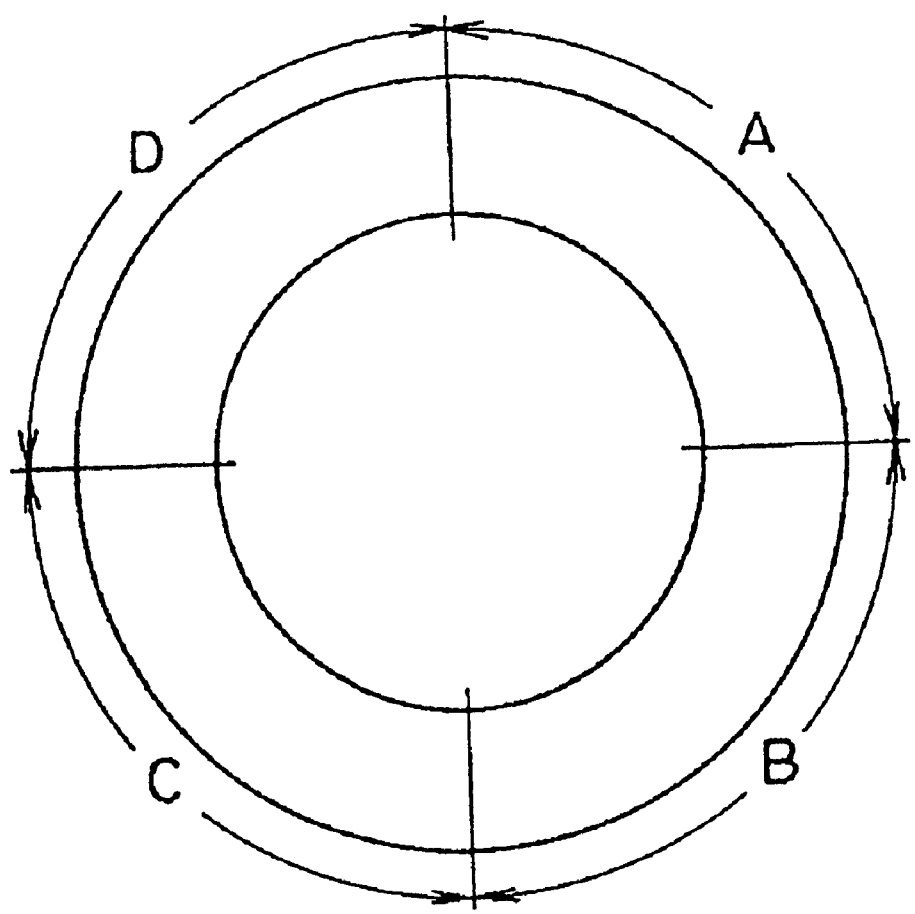
FIG. 7 is a diagram for explaining a modification of the carcass.

The carcass structure 6a is formed by looping one continuous reinforcement 10 during turning once around the tire axis. However, to shorten the manufacturing time, it is possible to use two or more reinforcements 10 being put side by side during looping. Further, it is also possible to use a plurality of reinforcements 10, for example, four reinforcements 10 each allotted to one fourth part A-D of the tire as shown in FIG. 7, and to wind or loop all of the reinforcements at the same time. Further, the carcass structure 6a may be formed by looping one reinforcement 10 or plural reinforcements 10 being put side by side during turning around the tire axis two or more times.

During winding the reinforcement 10, by abutting the edges each other in the radially outer layer 6B in the tread portion 2, accuracy in the cord spacings may be greatly improved. However, it is also possible to provide a certain space. Further, in case of the tape, it may be possible to overlap the edge portions one upon the other.

Further, the bead portions 4 are each provided between the inner layer 6A and the outer layer 6B of the carcass 6 with a bead apex 8 which is made of a hard rubber compound tapering radially outwardly from the radially outside of the bead core 5.

Comparison Test

Two types of motorcycle tires—an example tire 1 having the structure shown in FIG. 1 and a conventional tire 1 having two bias carcass plies—were made and tested for the lateral force variation (LFV).

Tire size: 110/180-18
Wheel rim size: MT3.00X18
Inner pressure: 200 Kpa
Tire load: 100 kgf
Slip angle: zero

TABLE 1

| Tire | Conv.1 | Ex.1 |
|---|---|---|
| Carcass | | |
| Structure | two bias plies | FIG. 1 |
| Cord | 1260d/2 | 1260d/2 |
| | nylon | nylon |
| Cord angle (deg) | 30 | 0 to 90 |
| Cord count(/5 cm) | 40 | 40 |
| Test results | | |
| LFV (index) | | |
| primary component | 100 | 16 |
| overall | 100 | 22 |

From the test, it was confirmed that the tire according to the invention was superior in the lateral force variation as well as the ply steer performance.

FIGS. 8–13 show a second embodiment of the present invention, in which a novel reinforcing structure 7a is employed as a tread-sidewall reinforcing layer 7 disposed outside the carcass 6.

The pneumatic tire in this embodiment is also a motorcycle tire. The tire comprises a tread portion 2, a pair of bead portions 4 with a bead core 5 therein, a pair of sidewall portions 3, a carcass 6 extending between the bead portions 4 and a tread-sidewall reinforcing layer 7 disposed on the outside of the carcass 6.

The tread portion 2 has a convex tread face which is curved continuously from one of the tread edges 2e to the other so that the maximum tire sectional width TW lies between the tread edges 2e.

The carcass 6 comprises a t least one ply of cords arranged radially at an angle of 70 to 90 degrees with respect to the tire equator C and extends between the bead portions 4 through the tread portion 2 and sidewall portions 3 and turned up around the bead cores 5 in the bead portions 4 from the inside to outside of the tire. For the carcass cords, organic fiber cords, e.g. nylon, polyester, rayon, aramid and the like can be used. In this example, the carcass 6 is composed of a single ply of nylon cords arranged at 90 degrees with respect to the tire equator C.

It is preferable for improving the steering stability to set the radial height h1 of the carcass turn up portion 6T in the range of from 25 to 60% of the tire section height H.

Between the carcass turn up portion 6T and ma in portion, each of the bead portions 4 is provided with a bead apex made of a hard rubber compound tapering radially outwardly from the radially outside of the bead core 5.

Figure 9:
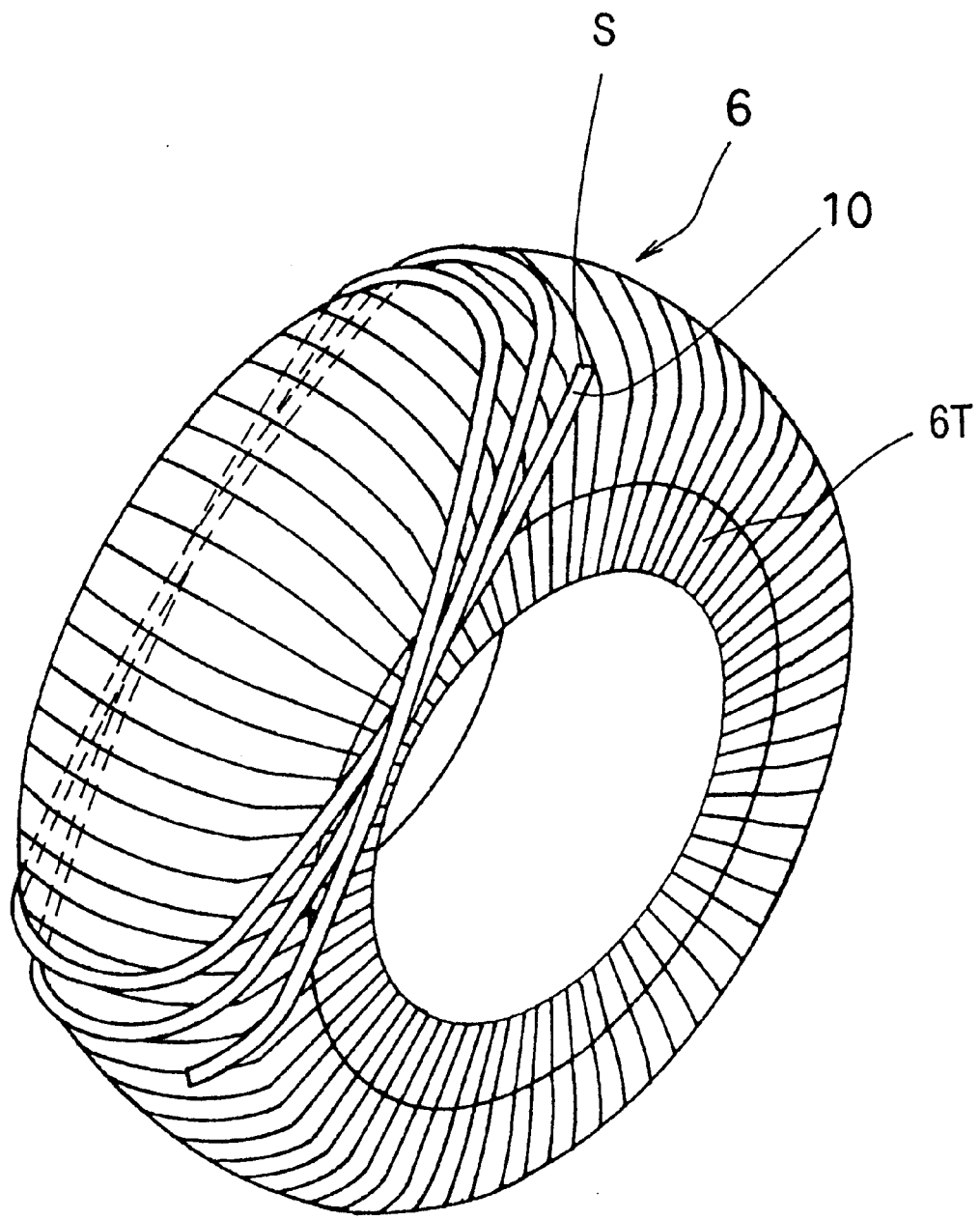
FIG. 9 is a schematic perspective view showing the tread-sidewall reinforcing layer thereof.
Figure 10:
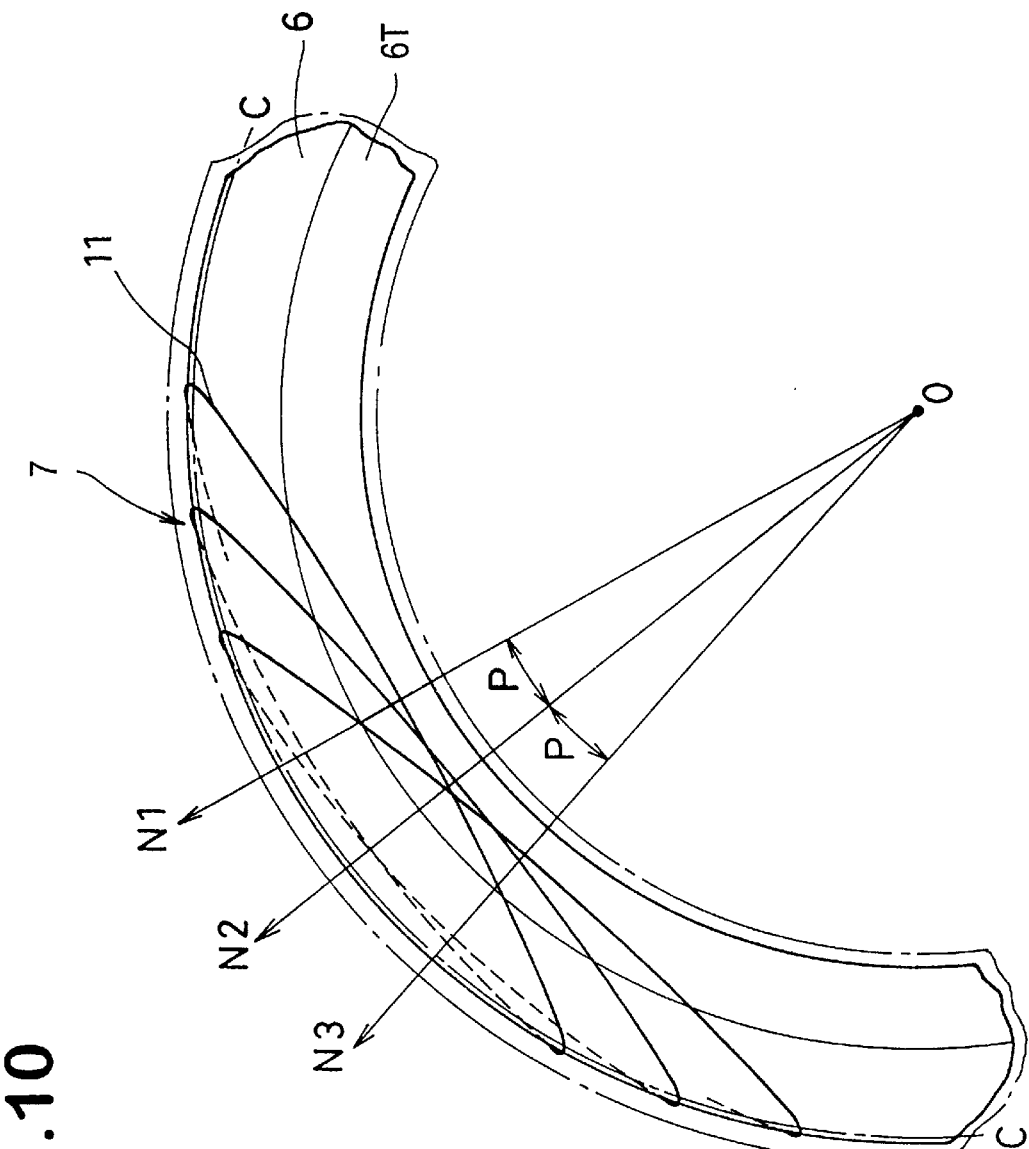
FIG. 10 is a schematic side view of the tread-sidewall reinforcing layer.

FIGS. 9 and 10 show the structure of the tread-sidewall reinforcing layer 7 in this embodiment. In these figures, the circumferential cord spacings are depicted as being very large for convenience sake. In fact the cord spacings are about 1 to 5 mm when measured in the circumferential direction at the tire equator C.

The tread-sidewall reinforcing layer 7 is composed of a series of loops which spread over the circumference of the tire. The loops are made of at least one continuous reinforcement 10. As explained above, the reinforcement 10 is a rubber coated single cord 11 shown in FIG. 4A or a rubber tape shown in FIG. 4B.

For the reinforcing cords 11, an aramid cord is used in this example. However, other organic fiber cords, e.g. nylon, rayon, polyester, and the like and steel cords and hybrid cords thereof can be used.

In the tread-sidewall reinforcing layer 7, the reinforcement 10 extends to draw loops while moving in one circumferential direction at a small pitch angle P around the tire axis O.

If attention is paid to each loop, as shown in FIG. 9, a loop
  starts from a position S for example near the right side tread edge,
  extends in the right side sidewall portion 3 through the bead portion 4,
  approaches the tread edge on the same side at the circumferentially different position,
  crosses the tread portion,
  extends in the lef t side sidewall portion 3 through the left side bead portion 4 to approach the tread edge,
  crosses again the tread potion, then
  returns to a position which corresponds to the start position S but shifts one pitch angle P in one circumferential direction.

The pitch angles P are in the range of from 0.1 to 5 degrees, preferably 0.1 to 2 degrees, more preferably 0.1 to 0.5 degrees, still more preferably 0.1 to 0.3 degrees.

Figure 8:
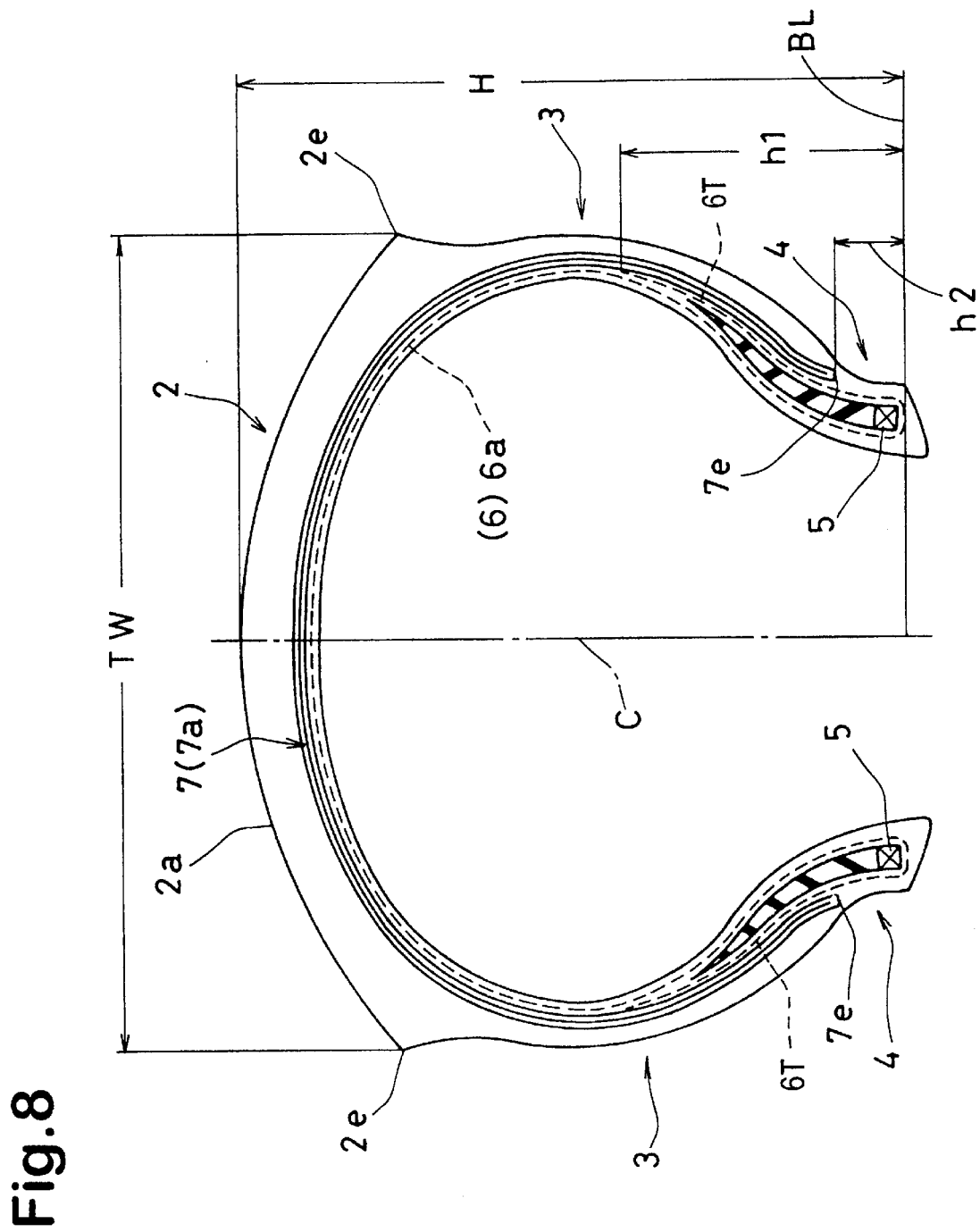
FIG. 8 is a cross sectional view of another embodiment of the present invention.

Therefore, as shown in FIG. 8, in a cross section including the tire axis, the tread-sidewall reinforcing layer 7 has a closed loop structure turning on the radially outside of the bead core 5 in each bead portion. Accordingly, the tread-sidewall reinforcing layer 7 has a double layered structure throughout. Therefore, separation failure starting from cord ends or ply edge can be effectively controlled.

Further, the cord arrangement becomes symmetrical with respect to the tire equator C.

Figure 11:
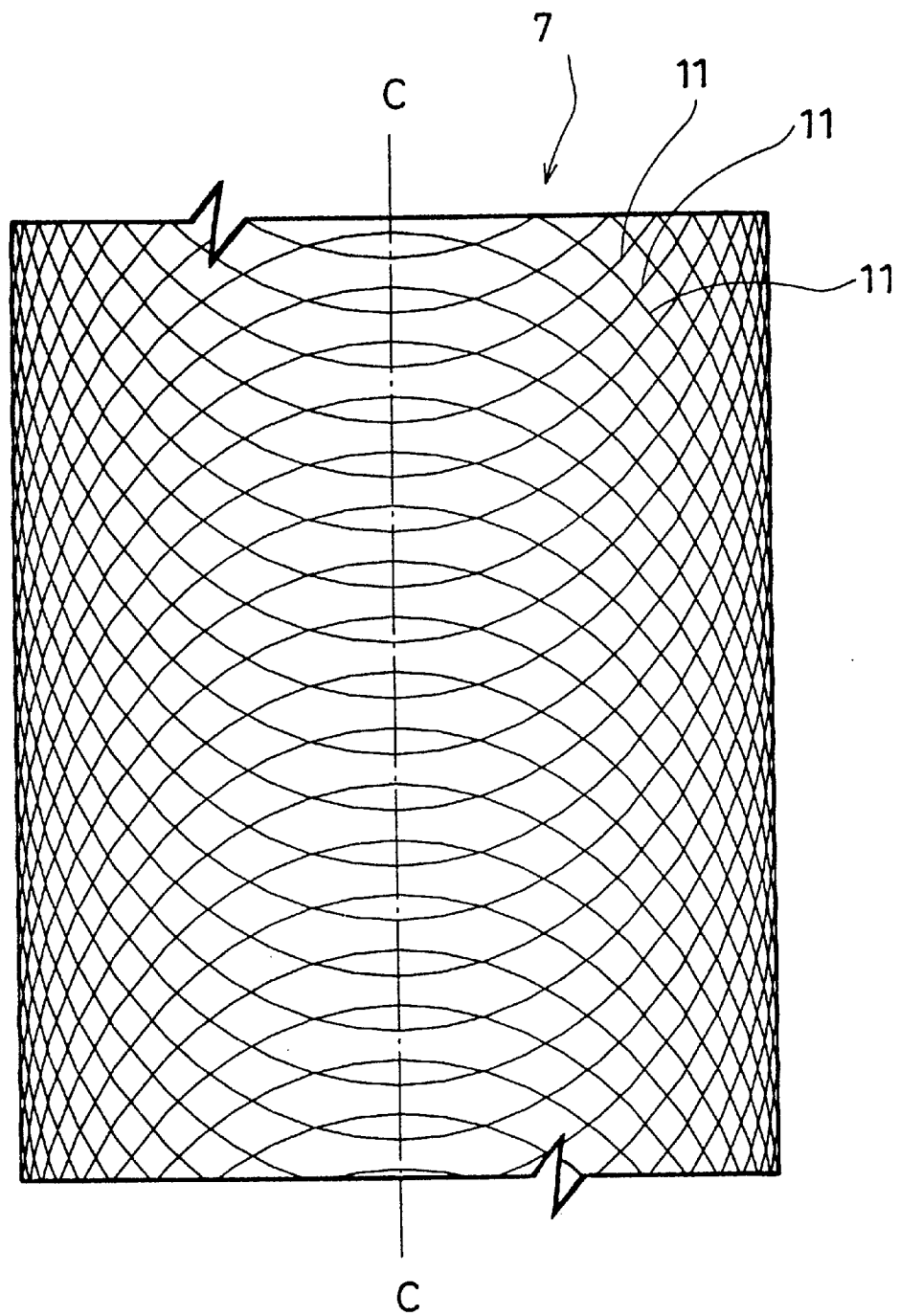
FIG. 11 is a plan view of the tread-sidewall reinforcing layer.
Figure 12:
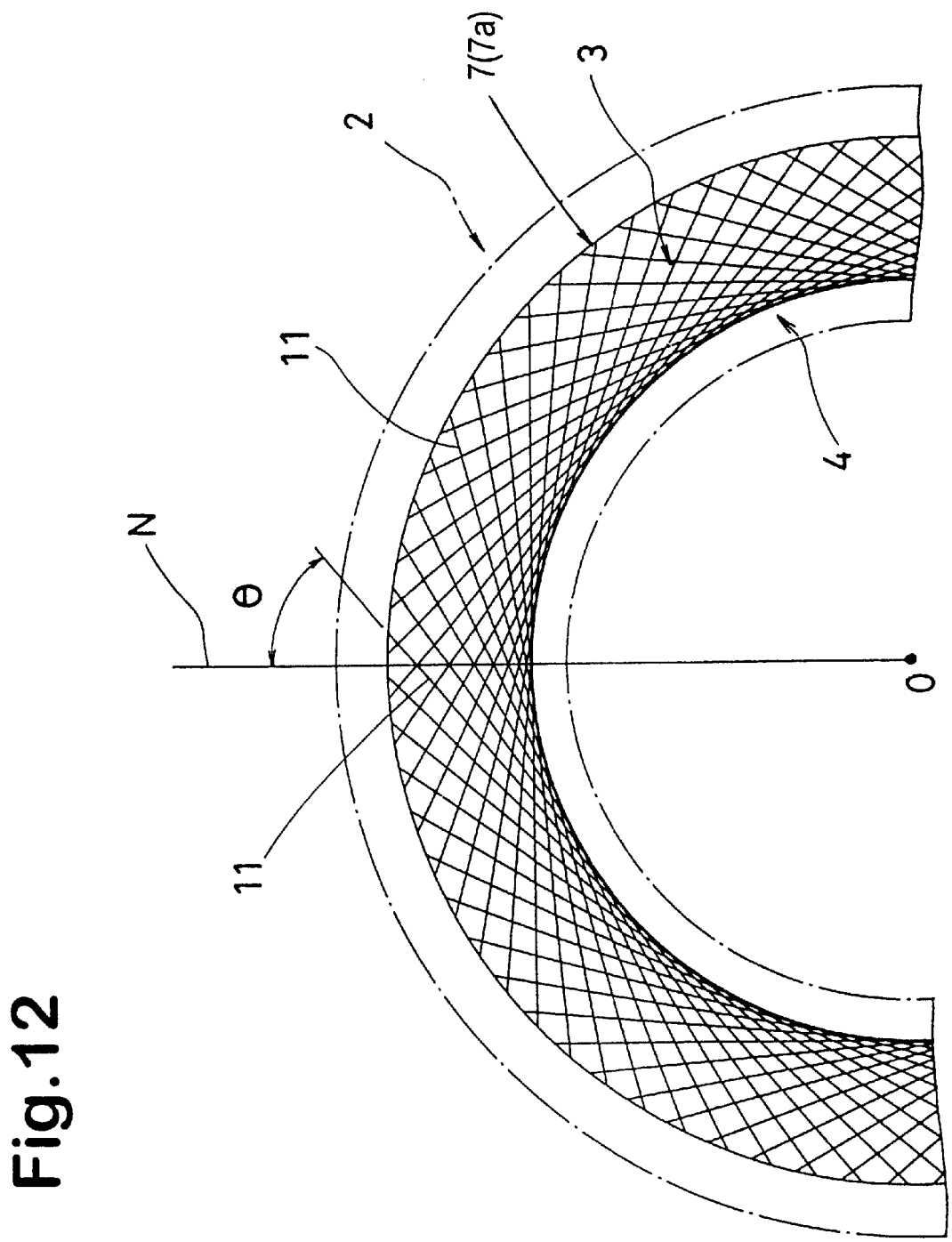
FIG. 12 is a side view of the tread-sidewall reinforcing layer.

In the tread portion 2, as shown in FIG. 11, the cord inclination in the radially outer layer is, for example, a left-side upward inclination on the left side of the tire equator C, but on the right side of the tire equator C, a right-side upward inclination. In the radially inner layer, on the other hand, the cord inclination is reverse to the outer layer. Therefore, the ply steer can be fully prevented. Furthermore, the cord segments in the radially outer layer cross those in the radially inner layer in a symmetrical manner. Also, in the sidewall portions, as shown in FIGS. 10 and 12, the cord segments in the inner layer cross those in the outer layer. As a result, the vertical and lateral stiffness of the tire can be improved.

As shown in FIG. 11, all the cord segments in the inner and outer layers cross the tire equator C at substantially 90 degrees, and the angle with respect to the tire circumferential direction gradually decreases from the tire equator C towards the bead potions and becomes substantially zero in the bead portions 4.

As shown in FIG. 12, when the cord 11 is projected on a the tire equatorial plane, the angle $\theta$ of the cord 11 with respect to the radial direction N is preferably set in the range of from 60 to 90 degrees. If the angle $\theta$ is less than 60 degrees, the circumferentially rigidity of the tire is liable to become insufficient.

The cord count in the circumferential direction is set in the range of less than 120/5 cm, preferably 40 to 120/5 cm more preferably 20 to 80/5 cm still more preferably 30 to 50/5 cm.

If more than 120/5 cm, the tread portion 2 and sidewall portion 3 are excessively increased in the rigidity, and the tire production efficiency is not good.

The tread-sidewall reinforcing layer 7 extends along the outside of the carcass 6 from one bead portion to the other bead portion and covers the axially outside of each of the carcass turn up portions 6T. The radial height h2 of the radially inner end 7e of the tread-sidewall reinforcing layer 7 is preferably set in the range of 10 to 40% of the tire section height H, each from the bead base line BL. The overlap with the carcass turnup portion 6T in the radial direction (=h1–h2) is preferably in the range of from 10 to 30% of the tire section height H.

Figure 13:
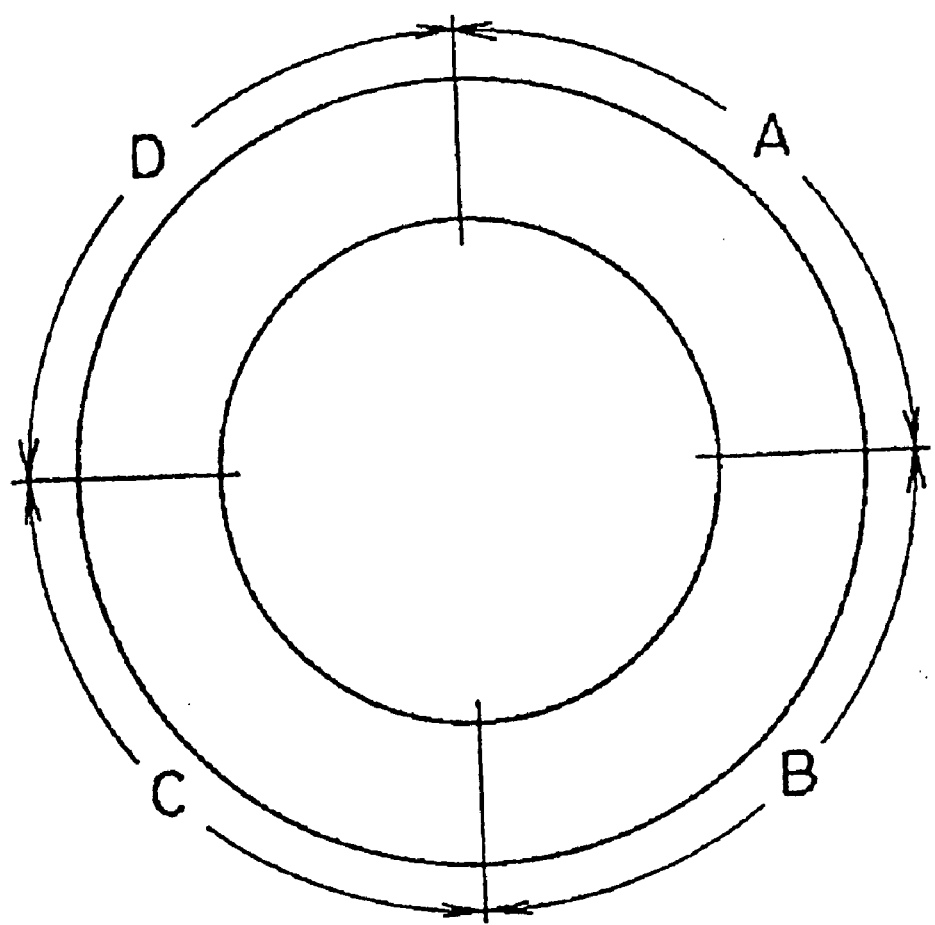
FIG. 13 is a diagram for explaining a modification of the tread-sidewall reinforcing layer.

The tread-sidewall reinforcing layer 7 is formed by looping one continuous reinforcement 10 during turning once around the tire axis. However, to shorten the manufacturing time, it is possible to use two or more reinforcements 10 being put side by side during looping. Further, it is also possible to use a plurality of reinforcements 10, for example, four reinforcements 10 each allotted to one fourth part A-D of the tire as shown in FIG. 13, and to wind or loop all the reinforcements 10 at the same time. Further, the tread-sidewall reinforcing layer 7 may be formed by looping one reinforcement 10 or plural reinforcements 10 being put side by side during turning around the tire axis two or more times.

FIGS. 14–20 show the third embodiment of the present invention, in which a novel reinforcing structure 7b is employed as a tread-sidewall reinforcing layer 7 disposed outside the carcass 6.

Figure 15:
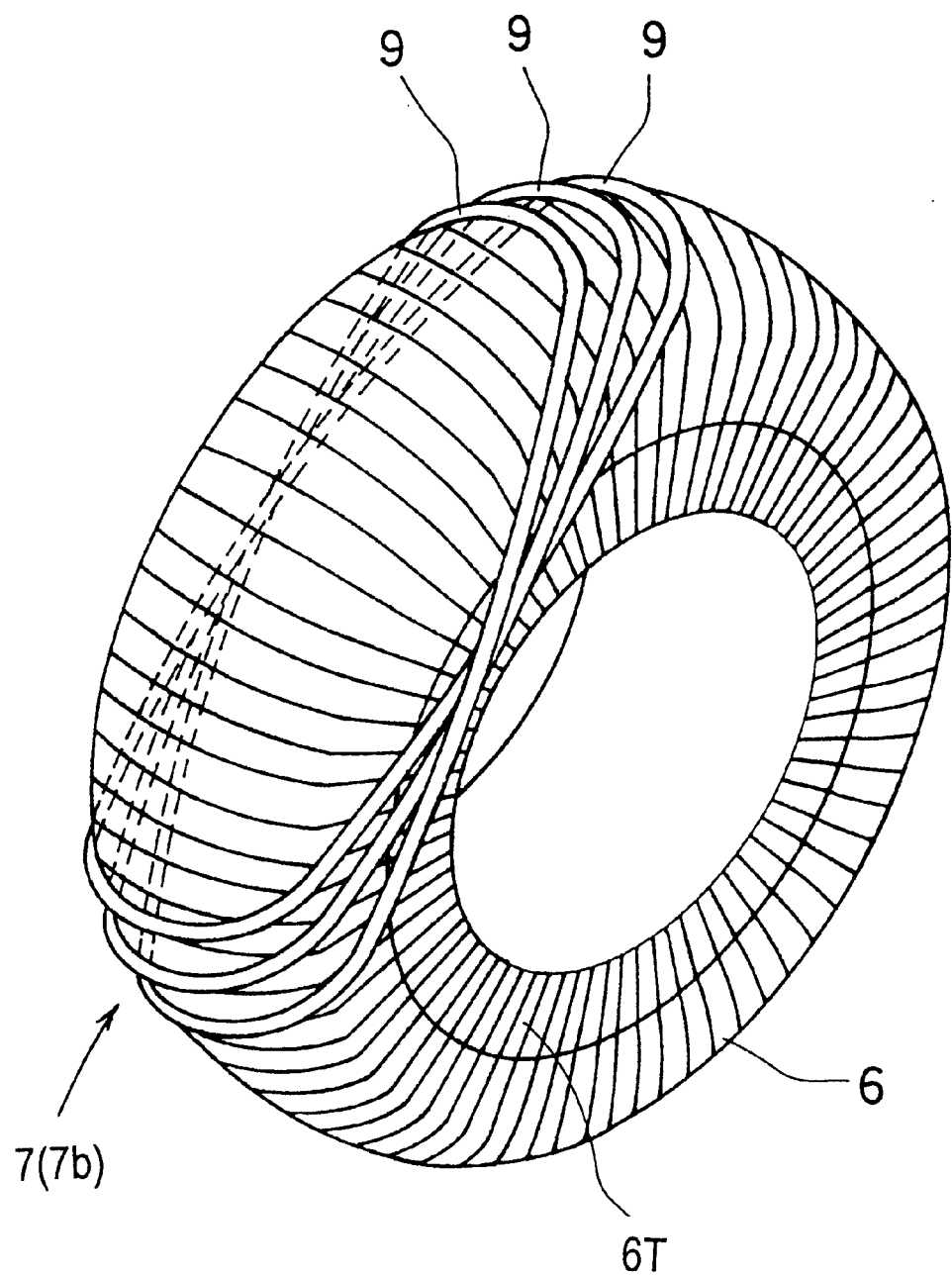
FIG. 15 is a schematic perspective view showing the tread-sidewall reinforcing layer thereof.
Figure 16:
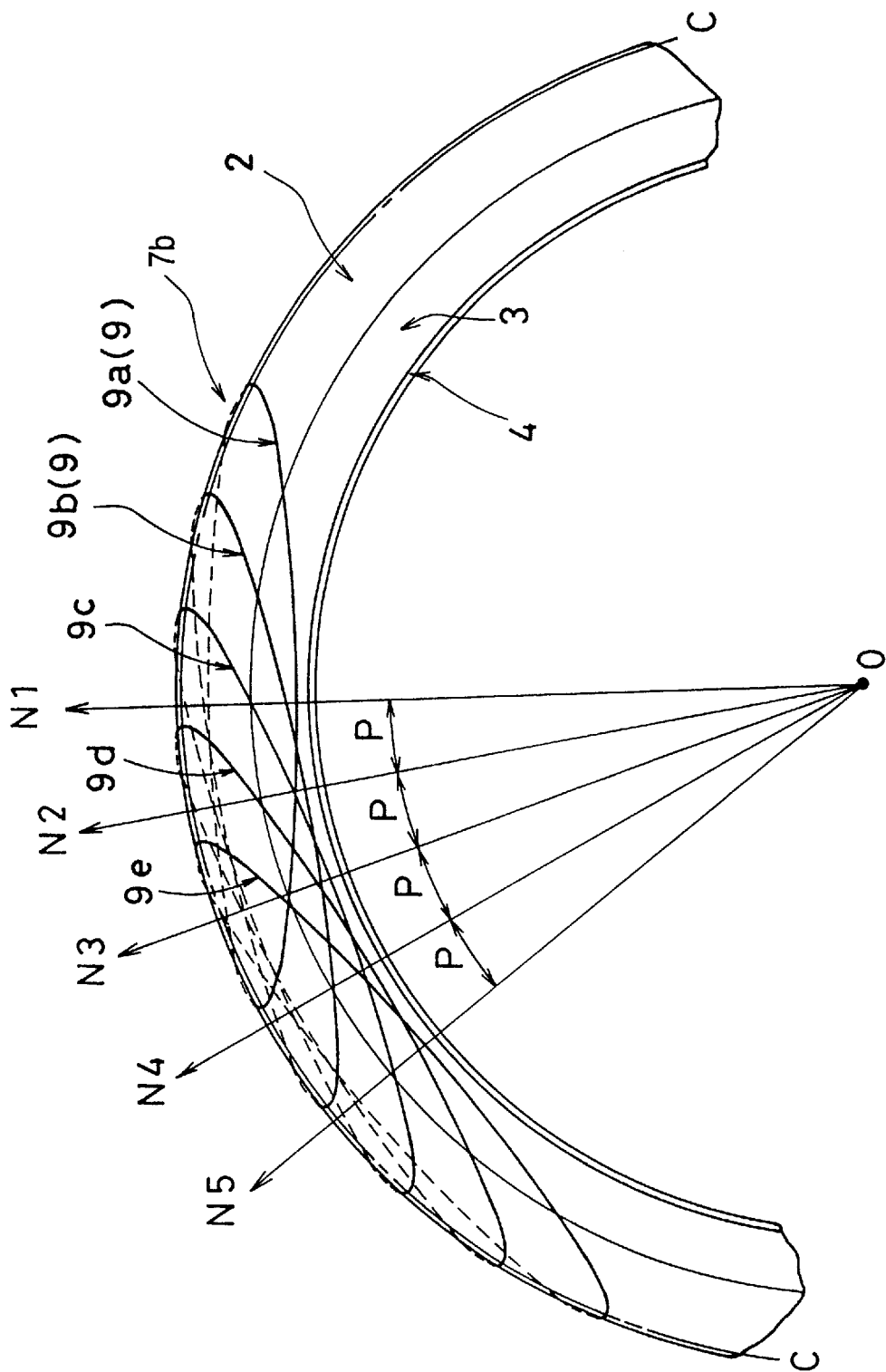
FIG. 16 is a schematic side view of the tread-sidewall reinforcing layer.

In this embodiment, similar to the second embodiment, the tread-sidewall reinforcing layer 7 is composed of a series of loops which spread over the circumference of the tire. However, as shown in FIGS. 15 and 16, the loops are independent from each other, which is the difference from the second embodiment.

Each of the loops is formed by a cord ring 9.

Figure 17:
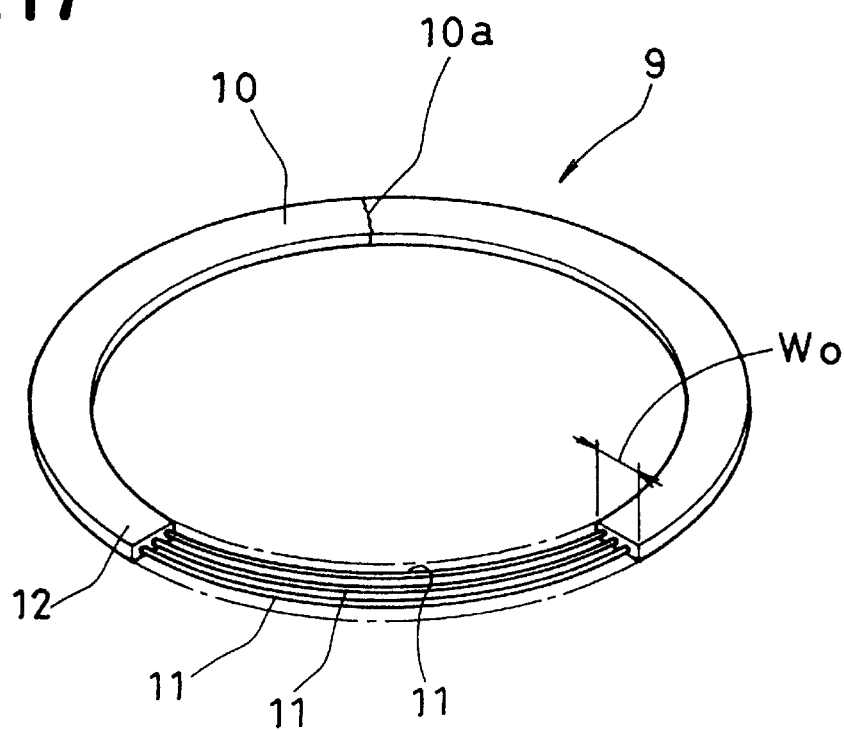
FIGS. 17 and 18 are perspective views showing examples of the cord ring.

FIG. 17 shows an example of the cord ring 9, which is an annular tape 10 of rubber 12 in which a single cord (=one turn cord) or a plural-turn cord or a plurality of parallel cords are embedded. The tape 10 has a substantially rectangular cross sectional shape whose width Wo is preferably 5 to 15 mm. Preferably, a two-to-ten-turn cord or two to ten parallel cords are embedded.

In case of a single cord or a plurality of parallel cords, it is preferable that the ends of each cord are connected by suitable means for example, adhesive, welding, melting and the like.

For the reinforcing cords 11, organic fiber cords, e.g. aramid, rayon, nylon, polyester and the like and steel cords and hybrid cords thereof can be used.

In this example, three aramid cords 11 are embedded as shown in FIG. 17.

Figure 18:
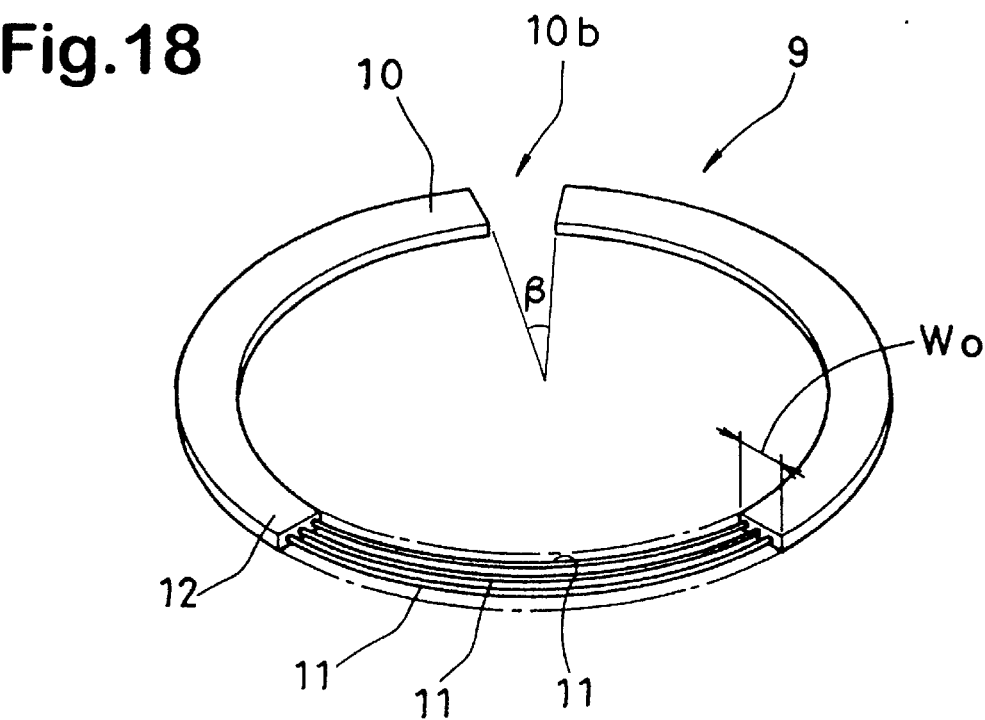

FIG. 18 shows a broken-ring tape 10 which may be used as the cord ring 9. In this broken-ring tape, a single cord or a plurality of parallel cords preferably two to ten parallel cords are embedded. The sectional shape is substantially rectangle whose width Wo is preferably 5 to 15 mm. The angle $\beta$ of the broken part 10b is less than 180 degrees, preferably less than 90 degrees, more preferably less than 45 degrees, still more preferably less than 30 degrees.

The cord rings 9 are disposed around the circumference of the carcass 6 one upon another during moving in one circumferential direction at a certain pitch angle P.

Figure 14:
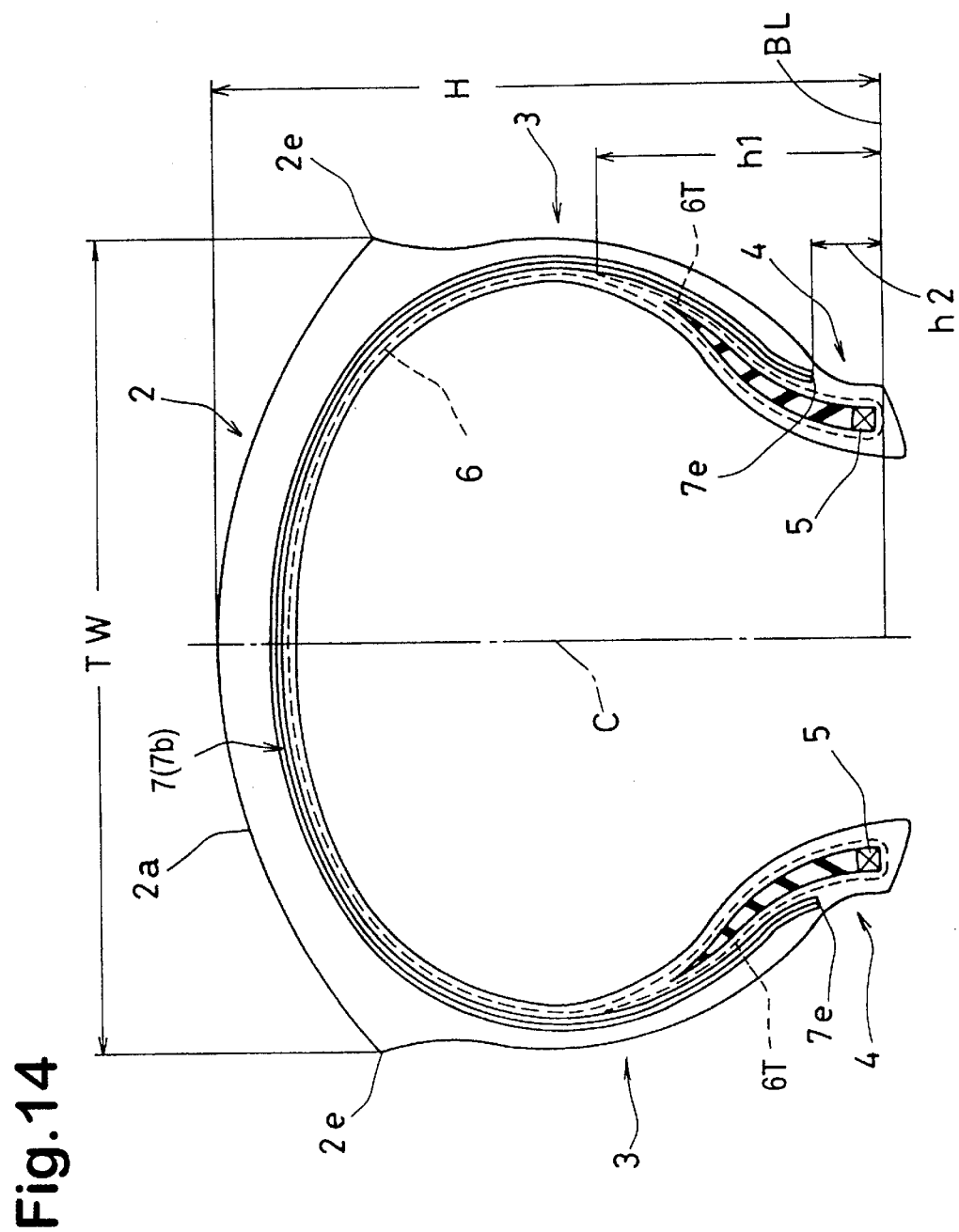
FIG. 14 is a cross sectional view of another embodiment of the present invention.

Therefore, the cord arrangement becomes symmetrical with respect to the tire equator C. Further, as shown in FIG. 14, in a cross section including the tire axis, the tread-sidewall reinforcing layer 7 has a double layered structure throughout.

Figure 19:
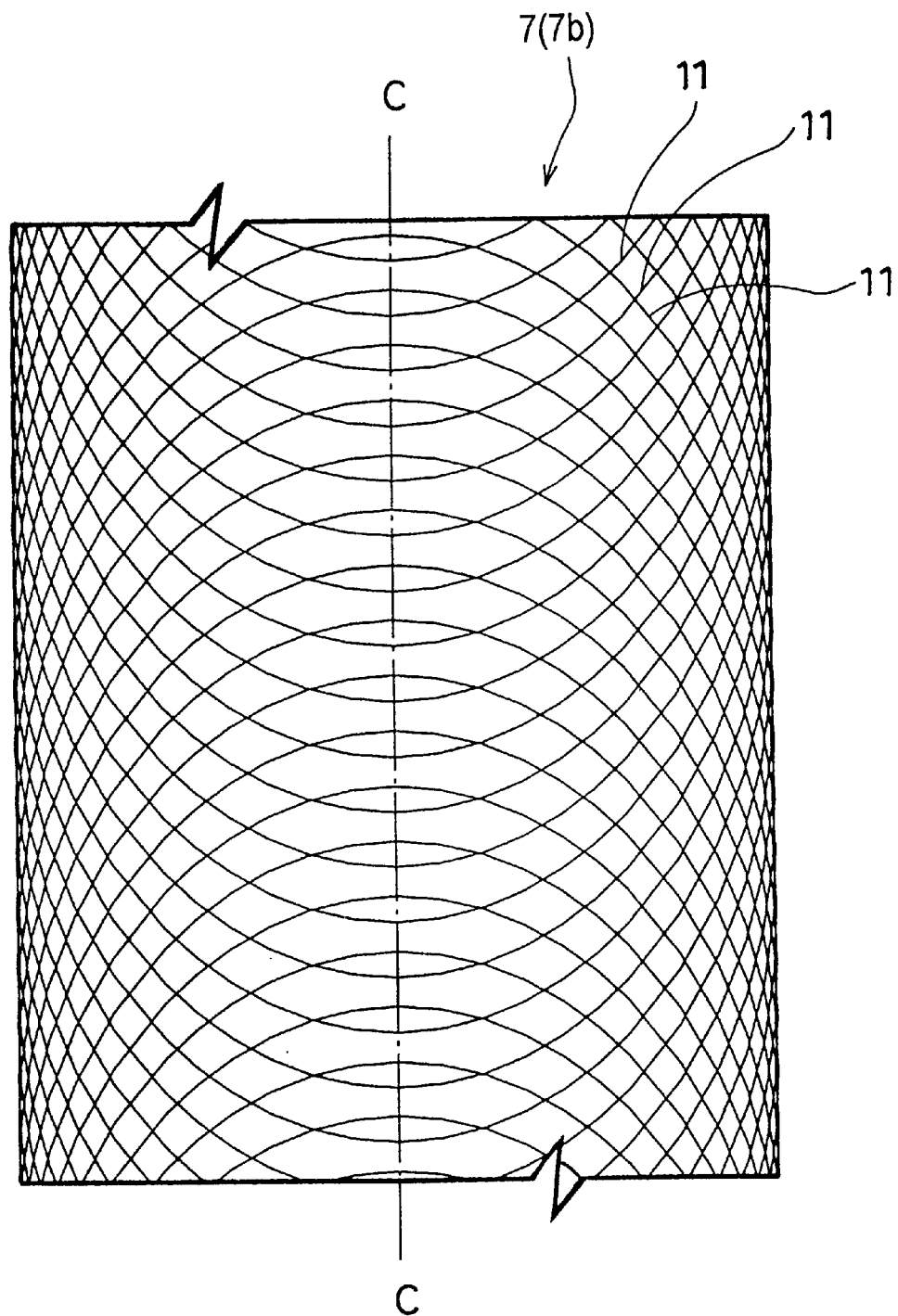
FIG. 19 is a plan view of the tread-sidewall reinforcing layer.
Figure 20:
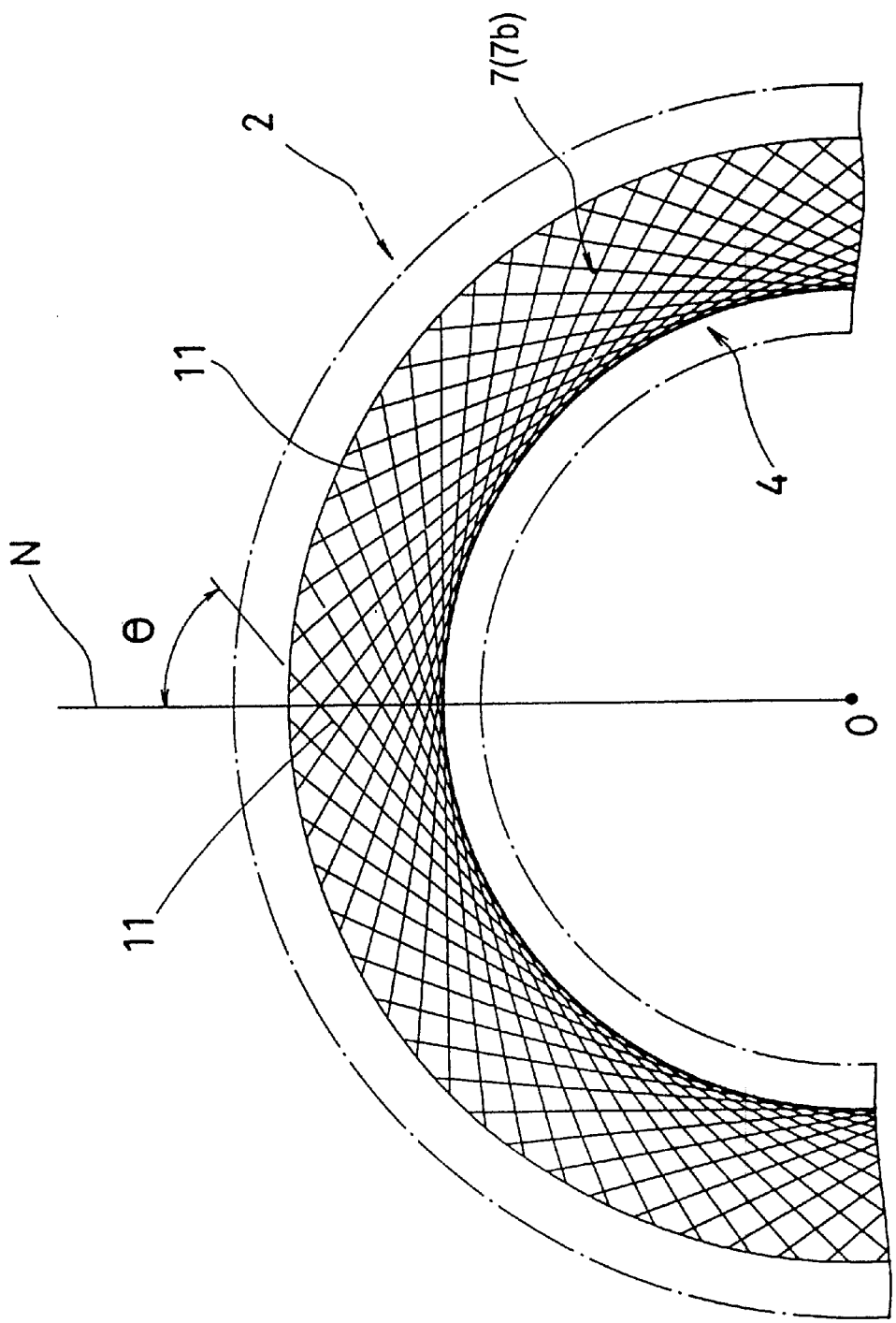
FIG. 20 is a side view of the tread-sidewall reinforcing layer.

In the tread portion 2, as shown in FIG. 19, the cord inclination in the radially outer layer is, for example, a left-side upward inclination on the left side of the tire equator C, but on the right side of the tire equator C, a right-side upward inclination. In the radially inner layer, on the other hand, the cord inclination is reverse to the outer layer. Therefore, the ply steer can be fully prevented. Furthermore, the cord segments in the radially outer layer cross those in the radially inner layer in a symmetrical manner. Also, in the sidewall portions, as shown in FIGS. 15, 16 and 20, the cord segments in the inner layer cross those in the outer layer. As a result, the vertical and lateral stiffness of the tire is effectively improved.

As shown in FIG. 19, all the cord segments in the inner and outer layers cross the tire equator C at substantially 90 degrees, and the angle with respect to the tire circumferential direction gradually decreases from the tire equator C towards the bead potions and becomes substantially zero in the bead portions 4.

As to the radial heights h1 and h2 and overlap h1–h2 (FIG. 1), the pitch angles P (FIG. 16), the angle θ (FIG. 20) and the cord count, the limitations explained in the above-mentioned second embodiment are applied here again. Further, as to the elements not specifically described herein, reference to the above-mentioned second embodiment is made.

Comparison Test

Three types of radial tires for motorcycles—an example tire 2 having the structure shown in FIG. 8, an example tire 3 having the structure shown in FIG. 14 and a conventional tire with two cut-end breaker belts—were made and tested for the one-side drifting, stiffness and steering stability.

Tire size: 160/80R16

Wheel rim size: MT3.50X16

Inner pressure: 225 Kpa

Tire load: 200 kgf

Camber angle: zero

One-side Drifting Test

The conicity force was measured with a tire uniformity tester. The results are indicated in Table 2 by an index based on the conventional tire being 100, wherein the smaller the index, the less the one-side drifting.

Tire Stiffness Test

The vertical stiffness and lateral stiffness were measured. The results are indicated in Table 2 by an index based on the conventional tire being 100, wherein the larger the index, the higher the stiffness.

Steering Stability Test

During running a 1500 cc motorcycle in a dry asphalt paved test course, the test rider evaluated the steering stability, wherein the test tire was mounted on the rear wheel. The results are indicated in Table 2 by an index based on the conventional tire being 100, wherein the larger the index, the better the steering stability.

TABLE 2

| Tire | conv.2 | Ex.2 | Ex.3 |
|---|---|---|---|
| Carcass | | 1 ply | |
| Cord | | 1260d/2 nylon | |
| Cord angle | | 90 deg. | |
| Cord count | | 40/5 cm | |
| Reinforcing layer | two cut-end belts | FIG. 8 | FIG. 14 |
| Cord | 1500d/2 aramid | 1500d/2 aramid | 1500d/2 aramid |

TABLE 2-continued

| Tire | conv.2 | Ex.2 | Ex.3 |
|---|---|---|---|
| Cord angle (deg) | 20 | variable | variable |
| Cord count/5 cm | 37 | 37 | 37 |
| h1/H | — | 0.42 | 0.42 |
| h2/H | — | 0.11 | 0.11 |
| Test results | | | |
| Conicity force | 100 | 30 | 32 |
| Vertical stiffness | 100 | 140 | 140 |
| Lateral stiffness | 100 | 160 | 155 |
| Steering stability | | | |
| Hold feeling | 100 | 170 | 160 |
| Lateral rigid feeling | 100 | 160 | 150 |

From the test, it was confirmed that in example tires 2 and 3 one-side drifting was effectively prevented, and the tire stiffness especially lateral stiffness was greatly increased, and the steering stability was remarkably improved.

To be brief, the above-mentioned tires can be manufactured as follows.

The tire in the first embodiment can be made by the steps of: holding a pair of assemblies of the bead core ring and bead apex, with providing a space therebetween; placing a profiled bladder between the bead core rings; inflating the bladder with fluid; winding loops of the reinforcing cord(s) around the bladder as explained above to form the carcass; applying a tread rubber, sidewall rubber and the like on the carcass; removing the bladder by deflating the bladder; putting the assembly into a mold to vulcanized it; and demolding the tire.

The tire in the second and third embodiments can be made as follows for example.

First, as shown in FIG. 9 or 15, the toroidal carcass 6 is made, wherein the bead core ring and bead apex rubber is wrapped in the turnup portion 6T. Then, loops of the reinforcing cord(s) are directly wound around the carcass as explained above to form the tread-sidewall reinforcing layer 7.

Further, as another example, it is possible to wind the loops around a profiled drum in a form of toroidal shape similar to the carcass profile. Then, the carcass 6 wound on the cylindrical drum is inserted in the tread-sidewall reinforcing layer 7 and the carcass is formed in a toroidal shape by inflating the drum.

In any case, when the assembly of the carcass 6 and the reinforcing layer 7 is made, a tread rubber, sidewall rubber and the like are applied thereon to form a raw tire, and the raw tire is vulcanized in a mold.

As can be seen from the above description, the present invention can be applied to passenger car tires, heavy duty tire and the like in addition to motorcycle tires. Further, if the loops of the reinforcing cord(s) are wound around a cylindrical drum in a form of cylinder. It can be applied to a tread reinforcing belt for various tires such as passenger car tires, heavy duty tires and the like.

What is claimed is:

1. A pneumatic tire comprising a tread portion, a pair of sidewall portions, a pair of bead portions, and a tread-sidewall reinforcement extending between the sidewall portions through the tread portion, the tread-sidewall reinforcement being made of a series of loops of at least one reinforcing cord spreading over the circumference of the tire, wherein all the loops are separate from each other and satisfy at least one of the following two conditions (1) the cord spacings measured in the tire circumferential direction at the tire equator are in the range of from 1 to 5 mm, and (2) the pitch angles of the loops are in the range of from 0.1 to 5 degrees.

2. The pneumatic tire according to claim 1, wherein viewed in the radial direction, the inclination angle of said at least one reinforcing cord with respect to the tire circumferential direction is substantially 90 degrees at the tire equator and decreases to substantially 0 degree gradually from the tire equator towards the bead portions.

3. The pneumatic tire according to claim 2, wherein viewed in the axial direction, the inclination angle of said at least one reinforcing cord with respect to the radial direction is in the range of from 60 to 90 degrees.

4. The pneumatic tire according to claim 3, wherein said bead portions are each provided therein with a bead core ring, said tread-sidewall reinforcement is a carcass, and said at least one reinforcing cord of each loop extends through the bead core ring from the inside to the outside of the tire in one of the bead portions and through the bead core ring from the outside to the inside of the tire in the other bead portion.

5. The pneumatic tire according to claim 3, wherein the bead portions are each provided therein with a bead core ring, and a carcass ply extending between the bead portions and turned up around the bead cores is provided, and said tread-sidewall reinforcement is disposed outside the carcass ply so as to cover the radially outer edges of the carcass ply turnup portions.

6. The pneumatic tire according to claim 2, wherein said bead portions are each provided therein with a bead core ring, said tread-sidewall reinforcement is a carcass, and said at least one reinforcing cord of each loop extends through the bead core ring from the inside to the outside of the tire in one of the bead portions and through the bead core ring from the outside to the inside of the tire in the other bead portion.

7. The pneumatic tire according to claim 2, wherein the bead portions are each provided therein with a bead core ring, and a carcass ply extending between the bead portions and turned up around the bead cores is provided, and said tread-sidewall reinforcement is disposed outside the carcass ply so as to cover the radially outer edges of the carcass ply turnup portions.

8. The pneumatic tire according to claim 1, wherein viewed in the axial direction, the inclination angle of said at least one reinforcing cord with respect to the radial direction is in the range of from 60 to 90 degrees.

9. The pneumatic tire according to claim 1, wherein said bead portions are each provided therein with a bead core ring, said tread-sidewall reinforcement is a carcass, and said at least one reinforcing cord of each loop extends through the bead core ring from the inside to the outside of the tire in one of the bead portions and through the bead core ring from the outside to the inside of the tire in the other bead portion.

10. The pneumatic tire according to claim 1, wherein the bead portions are each provided therein with a bead core ring, and a carcass ply extending between the bead portions and turned up around the bead cores is provided, and said tread-sidewall reinforcement is disposed outside the carcass ply so as to cover the radially outer edges of the carcass ply turnup portions.

11. The pneumatic tire according to claim 1, wherein each loop is formed as an annular rubber tape in which said at least one reinforcing cord is embedded.

12. The pneumatic tire according to claim 11, wherein said at least one reinforcing cord embedded in the annular rubber tape is a single winding of a single cord.

13. The pneumatic tire according to claim 11, wherein said at least one reinforcing cord embedded in the annular rubber tape is a plurality of windings of a single cord.

14. The pneumatic tire according to claim 11, wherein said at least one reinforcing cord embedded in the annular rubber tape is a plurality of cords.

* * * * *